United States Patent
Foulkes et al.

(10) Patent No.: US 10,419,580 B2
(45) Date of Patent: *Sep. 17, 2019

(54) AUTOMATIC QOS OPTIMIZATION IN NETWORK EQUIPMENT

(71) Applicant: EVENROUTE, LLC, Big Canoe, GA (US)

(72) Inventors: Jonathan Foulkes, Big Canoe, GA (US); Steve Christianson, Austin, TX (US)

(73) Assignee: EVENROUTE, LLC, Big Canoe, GA (US)

(*) Notice: Subject to any disclaimer, the term of this patent is extended or adjusted under 35 U.S.C. 154(b) by 312 days.

This patent is subject to a terminal disclaimer.

(21) Appl. No.: 15/619,949

(22) Filed: Jun. 12, 2017

(65) Prior Publication Data

US 2017/0279921 A1 Sep. 28, 2017

Related U.S. Application Data

(63) Continuation-in-part of application No. 15/274,384, filed on Sep. 23, 2016.

(Continued)

(51) Int. Cl.
*G06F 15/16* (2006.01)
*H04L 29/08* (2006.01)
(Continued)

(52) U.S. Cl.
CPC .......... *H04L 67/322* (2013.01); *G06F 9/5038* (2013.01); *H04L 12/4625* (2013.01);
(Continued)

(58) Field of Classification Search
CPC .............. H04L 67/322; H04L 12/4625; H04L 41/0816; H04L 41/083; H04L 43/08;
(Continued)

(56) References Cited

U.S. PATENT DOCUMENTS 6,078,953 A 6/2000 Vaid et al.
7,567,539 B2 * 7/2009 Fujiwara ............... H04W 24/00
370/338

(Continued)

FOREIGN PATENT DOCUMENTS

WO 2015066728 5/2015
WO 2017058657 4/2017
WO 2018231693 12/2018

OTHER PUBLICATIONS

Foulkes, Jonathan; International Search Report and Written Opinion for PCT Application No. PCT/US18/36862, filed Jun. 11, 2018, dated Aug. 29, 2018, 7 pgs.

(Continued)

*Primary Examiner* — Moustafa M Meky
(74) *Attorney, Agent, or Firm* — Taylor English Duma LLP (57) ABSTRACT

Systems, methods, and software for automatically optimizing QoS configuration in networking equipment. A network device measures current line metric values associated with a network connection of the device and compares the current line metric values to previously measured values to determine whether there has been a material change in a line metric value. If a material change in a line metric value has occurred, new QoS settings are computed for the network device based on the current line metric values measured, and the new QoS settings are applied to the QoS functions of the network device. The measuring, comparing, computing, and applying steps are repeated on a periodic basis in order to keep the QoS settings optimized to changing network conditions.

20 Claims, 7 Drawing Sheets

Related U.S. Application Data (60) Provisional application No. 62/233,465, filed on Sep. 28, 2015.

(51) Int. Cl.
  *H04L 12/927* (2013.01)
  *G06F 9/50* (2006.01)
  *H04L 12/24* (2006.01)
  *H04L 12/26* (2006.01)
  *H04L 12/46* (2006.01)
  *H04L 12/911* (2013.01)

(52) U.S. Cl.
  CPC ........ *H04L 41/083* (2013.01); *H04L 41/0816* (2013.01); *H04L 43/08* (2013.01); *H04L 47/805* (2013.01); *H04L 47/783* (2013.01); *H04L 67/1004* (2013.01)

(58) Field of Classification Search
  CPC . H04L 47/805; H04L 47/783; H04L 67/1004; G06F 9/5038
  See application file for complete search history.

(56) References Cited

U.S. PATENT DOCUMENTS

| | | | |
|---|---|---|---|
| 7,596,373 B2 | 9/2009 | McGregor et al. | |
| 7,653,005 B2 | 1/2010 | Zou et al. | |
| 7,684,332 B2 | 3/2010 | Ray et al. | |
| 8,139,606 B2 * | 3/2012 | Bekele | H04L 12/2801 370/229 |
| 8,266,477 B2 | 9/2012 | Mankovskii et al. | |
| 8,335,163 B2 | 12/2012 | Li et al. | |
| 8,474,000 B2 * | 6/2013 | Patti | H04N 21/2402 709/219 |
| 8,630,190 B2 | 1/2014 | Goyal et al. | |
| 8,650,294 B2 * | 2/2014 | Thyni | G06Q 50/188 709/220 |
| 9,054,966 B2 * | 6/2015 | Thyni | G06Q 50/188 |
| 9,819,610 B1 * | 11/2017 | Crump | H04L 47/805 |
| 2002/0143911 A1 | 10/2002 | Vicente et al. | |
| 2004/0105415 A1 * | 6/2004 | Fujiwara | H04W 24/00 370/338 |
| 2005/0144594 A1 | 6/2005 | Yamazaki | |
| 2007/0005786 A1 | 1/2007 | Kumar | |
| 2007/0030860 A1 * | 2/2007 | Bekele | H04L 12/2801 370/468 |
| 2008/0049638 A1 | 2/2008 | Ray | |
| 2012/0047547 A1 * | 2/2012 | Patti | H04N 21/2365 725/127 |
| 2013/0159518 A1 | 6/2013 | Curcio et al. | |
| 2013/0326047 A1 * | 12/2013 | Easty | H04L 41/5019 709/224 |
| 2014/0082162 A1 * | 3/2014 | Thyni | G06Q 50/188 709/220 |
| 2014/0355439 A1 | 12/2014 | Kakadia | |
| 2015/0106166 A1 | 4/2015 | Gutierrez | |
| 2015/0365309 A1 | 12/2015 | Kaminski et al. | |
| 2017/0093630 A1 | 3/2017 | Foulkes | |

OTHER PUBLICATIONS

Foulkes, Jonathan; Non-Final Office Action for U.S. Appl. No. 15/274,384, filed Sep. 23, 2016, dated Apr. 17, 2018, 41 pgs.

Foulkes, Jonathan; International Preliminary Report on Patentability for application No. PCT/US2016/053401, filed Sep. 23, 2016, dated Apr. 12, 2018, 9 pgs.

Foulkes, Jonathan; International Search Report and Written Opinion for PCT Application No. PCT/US2016/053401, filed Sep. 23, 2016, dated Dec. 8, 2016, 11 pgs.

Apostolopoulos, et al.; Article entitled: "Quality of service based routing: a performance perspective"; Proceedings of the ACM SIGCOMM '98; 17-18, 1998. [retrieved on Nov. 10, 2016]. Retrieved from the Internet, 13 pgs.

Chen, et al.; Article entitled: "Distributed Quality-of-Service Rerouting in Ad Hoc Networks", IEEE Journal on Selected Areas in Communications; vol. 17, Iss. 8; 1488-1505, 1999. [retrieved on Nov. 10, 2016]. Retrieved from the Internet, 20 pgs.

OpenWrt Wiki, "Smart Queue Management (SQM)—Minimizing Bufferbloat," accessed at https://wiki.openwrt.org/doc/howto/sqm, Created Apr. 28, 2015, Accessed Sep. 22, 2016, 5 pgs.

Foulkes, Jonathan; Final Office Action for U.S. Appl. No. 15/274,384, filed Sep. 23, 2016, dated Jan. 3, 2019, 37 pgs.

Foulkes, Jonathan; Applicant-Initiated Interview Summary for U.S. Appl. No. 15/274,384, filed Sep. 23, 2016, dated Mar. 29, 2019, 3 pgs.

Foulkes, Jonathan; Extended European Search Report for serial No. 16852344.7, filed Sep. 23, 2016, dated Mar. 26, 2019, 11 pgs.

* cited by examiner

AUTOMATIC QOS OPTIMIZATION IN NETWORK EQUIPMENT

CROSS-REFERENCE TO RELATED APPLICATIONS

This application is a continuation-in-part of pending U.S. patent application Ser. No. 15/274,384, filed Sep. 23, 2016, and entitled "AUTOMATIC QOS OPTIMIZATION IN NETWORK EQUIPMENT," which claims the benefit of U.S. Provisional Application No. 62/233,465, filed Sep. 28, 2015, entitled "Method for automatic setting and optimization of Quality of Service properties in network equipment," the entire disclosures of which are hereby incorporated herein by this reference.

BACKGROUND

Conventional networking equipment, such as routers, access points, gateways, switches, and the like, generally attempt to ensure that end user traffic is propagated and managed in such a way as to decrease re-transmissions and minimize lag or latency. However, due to an ever-decreasing cost of memory, networking equipment has evolved to include large buffers at every stage of the transmission path. This has led to a phenomenon known as "bufferbloat," in which downstream equipment sends data to upstream equipment as fast as it will receive it, with no concern for the true end-to-end actual throughput capacity of the connection. This may result in congestion (or "bloat") as the upstream equipment fails to send along all the buffered data in a timely manner, causing packets to become queued in buffers for too long. In a first-in-first-out queuing system, overly large buffers result in longer queues and higher latency, but do not improve network throughput and may even reduce throughput to zero in extreme cases.

To help combat this problem, many different traffic management algorithms have been developed to increase the Quality of Service ("QoS") provided by certain key networking equipment, such as routers. However, to be effective, these QoS algorithms need very precise configuration. This configuration can become quite complex due to multiple factors that must be taken into account, such as the type of connectivity and associated protocol overhead (e.g. PPPoE on DSL) and the actual network link throughput between the network gear and the ultimate destination, measured in both directions.

Generally, QoS algorithms are designed to manage the packet flow at times of link saturation. Knowing exactly when and where the saturation points occur is also important to optimal configuration. In addition, conditions of the network link can change over the course of the day/week depending on upstream networking issues, such as overloaded ISP backhauls during the evening when the majority of users are making heavy use of the network. As link saturation, link throughput capacity, and other factors change over time, any manual tuning (assuming it was originally done correctly) may become ineffective and possibly detrimental.

It is with respect to these and other considerations that the disclosure made herein is presented.

SUMMARY

The present disclosure relates to systems, methods, and software for automatically optimizing QoS configuration in networking equipment. An exemplary method of optimizing QoS configuration in a network device includes measuring current line metric values associated with a network connection of the network device and comparing the current line metric values to previously measured values to determine whether there has been a material change in a line metric value. If a material change in a line metric value has occurred, new QoS settings are computed for the network device based on the current line metric values measured, and the new QoS settings are applied to the QoS functions of the network device. The measuring, comparing, computing, and applying steps are repeated on a periodic basis in order to keep the QoS settings optimized to changing network conditions.

In further embodiments, an exemplary computer-readable storage medium comprises processor-executable instructions that, when executed by a processing resource of a network device, cause the network device to collect performance measurements associated with a connection of the network device to a network and send the performance measurements to a web service over the network, wherein the web service computes QoS settings for the network device based on the performance measurements for the connection. The network device receives the computed QoS settings from the web service over the network, and applies the computed configuration settings to QoS functions of the network device.

In further embodiments, an exemplary system comprises a web service and a network router. The web service executes on a network and is configured to compute and return optimized QoS settings for network devices based on received line metrics. The network router is operably connected to the network by a network connection and comprises a firmware, QoS functions, and an optimization control module. The optimization control module is configured to collect current line metrics associated with the network connection and determine if there has been a material change in a line metric value. Upon determining that there has been a material change in a line metric value, the optimization control module sends the current line metrics to the web service, receives the optimized QoS settings, and applies the optimized QoS settings to the QoS functions of the network router.

Various embodiments and implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The present disclosure describes systems, methods, and software for automatically optimizing QoS configuration in networking equipment. Utilizing the technologies described herein, the core network quality issues induced by bufferbloat may be remedied by ensuring that a well-configured, effective QoS process is applied to network links in a totally automatic and transparent way as soon as new networking equipment is deployed on the network. In addition, the benefits of ongoing QoS setting refinements over time may be achieved, whether manually or automatically initiated. By providing the network characterization task as a function of the network equipment itself, the vagaries of end user computing devices, the associated software, and the specific network does not influence the accuracy of measuring the link saturation points and the bufferbloat metrics. Once the metrics are collected, the embodiments described herein provide a series of functions that take these metrics and other relevant network device configuration information and calculate highly optimized QoS configuration properties, which are then automatically applied to the QoS service on the networking equipment.

According to some embodiments, link and bufferbloat metrics may be re-measured over time so as to enable the networking equipment to operate in the most optimal form and provide the highest quality of service possible in the circumstances. Bufferbloat metrics are typically based on calculating the differential in response latencies between quiescent network state and saturated network state. By applying analytics to the metrics collected over time, target QoS properties can be calculated for determined times of day so as to track forecasted changes in link saturation points. These new properties may then be applied to the QoS service at the determined times to ensure optimum performance. Accordingly, the embodiments described provide end users and their devices with a highly optimized network quality that enables smooth, reliable operation, even on saturated network links.

While some network connections may have capacity variations that are regular enough to predict and handle with a pre-set schedule of QoS settings, others may be completely random in their variability and line instability and drop in capacity must be detected and addressed on a near real-time basis. For example, a modem may have difficulties syncing with an upstream CMT/DSLAM due to poor signal-to-noise ratio ("SNR") characteristics on the line that result in unpredictable sync rate changes of 50% or more, requiring dramatic changes to any QoS settings associated with the connection. Or variability may be due to congestion in the ISP's backhaul from the CMT/DSLAM out to the rest of the Internet. This may be caused by over-subscription and over-provisioning of lines on the CMT/DSLAMs and/or heavy concurrent usage over an undersized backhaul. The result is a phenomenon referred to as "backhaul sag" since when the capacity is graphed over time, as sag appears during periods of congestion.

According to further embodiments, a recurring, dynamic process may be provided that non-intrusively measures current line metrics to determine if the web services should be invoked to calculate and update QoS settings that would take an immediate, if transient, effect. Line metrics may include link capacity (speed) in both upload and download directions, bandwidth utilization, traffic latency, signal attenuation, SNR, and/or the like. Frequent monitoring of changes in line metrics may allow detection of downstream network conditions, such as backhaul sag, that may occur at unusual times of the day, of changes in modem sync rates resulting from line instability caused by mechanical and/or electrical faults on the line, such as old, corroded home telephone wiring affecting DSL signals.

In some embodiments, a low-level process may execute on the networking equipment that constantly monitors latency in existing traffic flows to determine if a threshold latency has been exceeded. If so, then new QoS settings may be calculated in near-realtime which are applied dynamically to the networking equipment. Alternatively or additionally, the dynamic process may be executed at a high-frequency (e.g., once a minute) to measure current line metrics and compare them to past values. If a material variance in the line metrics is detected, then the current line metric values may be used to calculate and update the QoS settings in the networking equipment accordingly. By making the appropriate adjustments to QoS settings, as high a quality connection as possible may be maintained during these periods of instability, and regular performance may automatically recovered once the condition(s) have passed. Large or frequent sync rate changes are tracked in order to alert the customer to potential problems with their lines or wiring. Automatic detection of link conditions and adjusting of QoS parameters in near real-time may lead to continual high quality Internet experiences with faster page load times, consistent and good quality VoIP or video conference calls, smooth and uninterrupted media streaming, etc.

Figure 1:
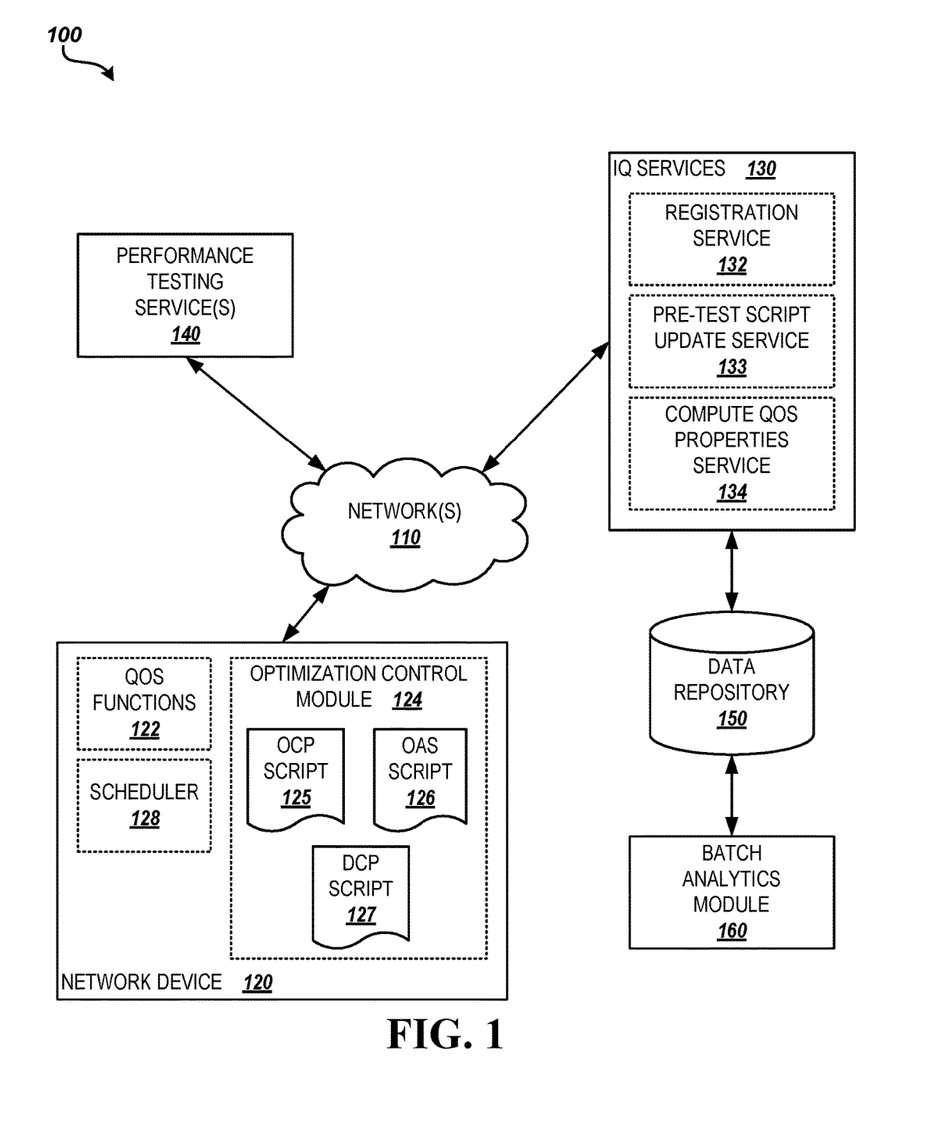
FIG. 1 is a block diagram of an illustrative configuration optimization system for automatically optimizing QoS configuration in networking equipment, according to some embodiments of the present disclosure.

FIG. 1 is a block diagram of an illustrative configuration optimization system 100 according to various embodiments of the present disclosure. The configuration optimization system 100 includes a network device 120. According to embodiments, the network device 120 represents any type of networking equipment that has network traffic management responsibilities on or between one or more networks 110. In some embodiments, the network(s) 110 may represent local area networks (LANs), wide area network (WANs), and/or other data, communication, or telecommunication networks that collectively make up the Internet. In further embodiments, any network(s) 110 that support the TCP/IP protocol may be utilized. For example, the network device 120 may represent an Internet router designed for a small office or home office ("SOHO") environment based on popular system-on-chip ("Sort") hardware implementations. In further embodiments, the network device 120 may represent an enterprise gateway, a wireless access point, a smart network switch, or the like.

According to embodiments, the network device 120 includes a firmware (not shown) that controls the operation and network traffic management functions of the device. In some embodiments, the firmware may include a derivation of common open-source networking platforms, such as OpenWRT®, upon which extensions are implemented to incorporate the functionality described herein. For example, extensions may be implemented by any combination of firmware code modifications, additional software modules, shell scripts, and the like. The firmware may include QoS functions 122 that allow the network device 120 to manage network traffic with a variety of QoS algorithms known in the art. The firmware may further include a scheduler 128 for running configuration, maintenance, and other processes at defined times and frequencies, such as the cron scheduler included in the OpenWRT® Linux distribution.

The network device 120 may also include an optimization control module 124. The optimization control module 124 may represent software, firmware, or firmware extensions on the network device 120 to control the processes described herein for automatically configuring and optimizing the QoS functions 122 or device configuration settings. In some embodiments, the optimization control module 124 may include one or more shell scripts, such as an optimization control process script 125, an optimization adjustment script 126, and a dynamic control process script 127, which perform the functions and processes described herein. For example, the optimization control process script 125 and/or optimization adjustment script 126 may perform aspects of the method 300 described herein for automatically optimizing QoS configuration in networking equipment, according to some embodiments. The dynamic control process script 127 may perform the method 400 described herein for dynamically applying optimized QoS configuration settings in networking equipment based on current line metrics, according to further embodiments. The optimization control module 124 may further leverage the scheduler 128 for scheduling periodic, recurring invocations of these and other scripts.

According to further embodiments, the configuration optimization system 100 also includes IQ services 130 that provide supporting functions to the optimization control module 124 on the network device 120 for automatically optimizing the configuration of the QoS functions 122 of the network device, as described herein. The IQ services 130 may include a number of Web services or other network services executing on one or more server computers available to the network device 120 across the network(s) 110. The network device 120 may access the IQ services 130 via any number of service calling protocols known in the art, including REST, SOAP, WSDL, HTTP, FTP, and/or any combination of these and other service calling protocols. In some embodiments, the IQ services 130 may be hosted by one or more third-party cloud platform providers, such as AMAZON WEB SERVICES™ ("AWS") from Amazon Web Services, Inc.

In some embodiments, the IQ services 130 may include a registration service 132 allowing the network device to register with the IQ services and obtain security credentials for subsequent service calls. In some embodiments, the registration service 132 may provide an application program interface ("API") for registration calls from the optimization control module 124, such as the following:

Input:
reg mac address of network device 120
Output:
username, password

In further embodiments, the IQ services 130 may include a pre-test component update service 133 that allows the network device 120 to update its firmware, extensions, and/or shell scripts before performing the functions described herein for automatically optimizing the configuration of the QoS functions 122 of the network device. For example, the pre-test component update service 133 may provide an API for script update calls from the optimization control module 124, such as the following:

Input: (supply only one)
firmware version
IQtest version
Output:
url to update file(s) on server (NULL if no update)

In further embodiments, the IQ services 130 includes a compute QoS properties service 134, also referred to herein as the "CQP service 134," that provides various services to the network device 120 for receiving network test results, calculating and returning QoS settings, providing QoS configurations to the device, determining optimality of the QoS configuration, logging results, and the like. For example, the CQP service 134 may provide an API for the optimization control module 124 to retrieve QoS settings based on performance measurements of the connection of the network device 120 to the network(s) 110, such as latency, line speed (up and down), and the like, in addition to other properties of the connection, such as connection type, (DSL, VDSL, cable, etc.), connection protocol (PPPoE, DHCP, etc.), and the like. In some embodiments, the CQP service 134 may provide a calculate QoS API comprising the following:

Input:
sqm qos
modem dsl, vdsl, cable
upload line upload in kbit/s
download line download in kbit/s
Output:
upload QoS value, download QoS value According to some embodiments, the CQP service 134 may retrieve optimized QoS settings, such as upload and download bandwidth limits, from lookup tables based on the input parameters. The lookup tables may be developed from one or more of published optimization matrices and algorithms, crowd sourced values, extensive configuration testing, and the like. For example, a set of lookup tables may contain optimized upload and download bandwidth limitation factors by connection type (e.g., dsl, vdsl, cable, fiber, etc.). The CQP service 134 may retrieve the bandwidth limitation factors for the type of connection specified, multiply the factors by the line speeds provided, and return optimal upload and download bandwidth limits to be applied to the QoS configuration on the network device 120.

Similarly, the CQP service 134 may provide an API for the optimization control module 124 to dynamically calculate QoS configuration settings based on current performance measurement values, also referred to herein as "line metrics," for the connection between the network device 120 and the network(s) 110. Line metrics may include current sync rates or line speeds (up and down), bandwidth utilization (up and down), baseline latency and measured latencies, signal attenuation (up and down), signal-to-noise ratio ("SNR") (up and down), and the like, in addition to other properties of the connection, such as connection type, (DSL, VDSL, cable, etc.), connection protocol (PPPoE, DHCP, etc.), and the like. In some embodiments, the CQP service 134 may provide a dynamic QoS calculation API comprising the following:

Input:
qos current qos
line rate current line rate
upload current line upload usage in kbit/s
download current line download usage in kbit/s
latencies current baseline and measured latencies
Line up current line upload rate in kbit/s
Line down current line download rate in kbit/s Atten-up current line up attenuation in dBs
Atten_down current line down attenuation in dBs
SNR_up current line up SNR in dBs
SNR_down current line down SNR in dBs
Output:
upload QoS value, download QoS value According to embodiments, the CQP service 134 may maintain past line metric values for the network devices 120. The CQP service 134 may compare the value of the input parameters to the past line metrics to determine variances, also referred to herein as "deltas." If any of the variances exceed a threshold value, the CQP service 134 may calculate new QoS settings based on the metric that has changed in order to maintain optimal QoS configuration for the current line conditions. For example, if latencies exceed threshold values, or if signal attenuation or SNR deltas indicate degradation in the connection, the CQP service 134 may reduce the upload and/or download QoS bandwidth limitation values accordingly until latencies go back down or line metrics improve.

The CQP service 134 may further provide an API for the optimization control module 124 to retrieve a rating calculated for the configured QoS functions 122 of the network device 120 based on performance measurements from the network. This rating is also referred to herein as the "IQ rating." For example, the optimization control module 124 may call the calculate IQ rating API after an initial round of configuration and testing are complete, as described herein. The CQP service 134 and/or optimization control module 124 may also determine whether additional optimization is required based on the IQ rating, as further described below. The calculate IQ rating API may comprise the following:
Input:
calc bloat
modem dsl, vdsl, cable
baseline baseline latency in ms
latency latency at load in ms
qosdownload qosdownload in kbit/s
qosupload qosupload in kbit/s
actualupload actual upload in kbit/s
actualdownload actual download in kbit/s
lastbloatvalue 0-5
tuning true, false
Output:
grade, optimizingspeedresponse, revertresponse, newspeed According to some embodiments, the "grade" value in the output indicates the IQ rating value, while the "optimizingspeedresponse" value indicates when final QoS settings have been calculated. The "newspeed" value may contain the final QoS settings. If final QoS settings have not been calculated, e.g. the IQ rating indicates additional optimization is necessary, then the "newspeed" value may contain adjusted QoS settings to be set before performing additional test iterations, as described below. If the recalculated QoS settings are not better than the previous QoS settings, the "revertresponse" value may indicate to the optimization control module 124 that it should revert to the previous QoS settings.

The CQP service 134 may further provide an API for the optimization control module 124 to retrieve a pre-test QoS configuration for configuring the QoS functions 122 of the network device 120 prior to executing testing functions, as described herein. The returned QoS configuration may include static QoS configuration settings for queue management, packet scheduling, traffic prioritization, and the like as well as pre-optimized QoS settings, such as upload and download bandwidth limitations. According to some embodiments, the CQP service 134 may return the QoS configuration as a series of standard configuration commands to be executed by the firmware of the network device 120 in order to configure the corresponding functions. For example, the CQP service 134 may return a series of commands based on the Unified Configuration Interface ("UCI") implemented in OpenWRT®. The retrieve pre-test QoS configuration API may comprise the following:
Input:
sqm pre
proto dhcp, pppoe, static
Output:
uci cmd 1, uci cmd 2, . . . uci cmd n Similarly, the CQP service 134 may provide an API for the optimization control module 124 to retrieve a post-test QoS configuration after optimization for final configuration of the QoS functions 122 of the network device 120. The post-test QoS configuration may contain optimized QoS settings based on the results of the optimization process performed. The post-test QoS configuration may further contain optimal QoS configuration settings for queue management, packet scheduling, traffic prioritization, and the like determined based on the optimization process. The API may further save provided tuning metrics for storage for future batch analytics, as described below. The retrieve post-test QoS configuration API may comprise the following:
Input:
sqm post
modem dsl, vdsl, cable
proto dhcp, pppoe
qosupload qosupload in kbit/s
qosdownload qosdownload in kbit/s
bloatup A+, A, B, C, D, F
bloatdown A+, A, B, C, D, F
actualupload actual upload in kbit/s
actualdownload actual download in kbit/s
timestamp device timestamp
Output:
uci cmd, uci cmd 2, uci cmd n The CQP service 134 may further provide an API for the optimization control module 124 to upload tuning metrics captured during initial setup and/or periodic optimization of the network device 120 to help optimize the QoS functions 122 and/or device configuration settings of the device, as described herein. The uploaded tuning metrics and calculated QoS values, along with the day and time they are determined, may be used to generate optimization schedules as well as create predictive schedules around this day/time period. The post tuning metrics API may comprise the following:
Input:
sqm post
modem dsl, vdsl, cable
proto dhcp, pppoe
qosupload qosupload in kbit/s
qosdownload qosdownload in kbit/s
bloatup A+, A, B, C, D, F
bloatdown A+, A, B, C, D, F
actualupload actual upload in kbit/s
actualdownload actual download in kbit/s
timestamp device timestamp
Output:
result (success or fail)

The CQP service 134 may further provide an API for the optimization control module 124 to retrieve one or more schedules for performing periodic optimization processes of the network device 120, applying various QoS settings to the QoS functions 122 of the device at various times of day or days of the week, and other monitoring or tuning operations. The optimization control module 124 may then apply the retrieved schedule(s) to the optimization and tuning processes through the scheduler 128 of the network device 120, according to embodiments. The retrieve tuning schedule API may comprise the following:

Input:
execute refresh schedule
Output:
schedule1, schedule2, . . . schedulen

For example, during an initial configuration of a network device 120, the CQP service 134 may return a schedule to the network device that causes the optimization process to be executed in 4 time slots in a 24 hour period, e.g., at 8:00 AM, 12:00 PM, 9:00 PM, and 4:00 AM. If latency, line speed, and other line metrics regarding the connection of the network device 120 show stable across the time periods, then the CQP service 134 may record the network device 120 as being stable, and the optimization control module 124 may rely on the passive dynamic control process described herein for monitoring and responding to changing line conditions. However, if the line metrics shows one or more periods of instability, the CQP service 134 may return a schedule to the network device 120 that causes the optimization process to be executed every T hours for at least N days to determine various times of day when the latency spikes or line stability degrades. Once patterns are established (or the periodic optimization process has run for the maximum number of days), the CQP service 134 may then provide a schedule to the network device 120 comprising multiple sets of QoS settings and times of day when each set of QoS settings should be applied in order to keep the network device optimally configured over changing line and/or network conditions. The scheduler 128 may then execute the optimization adjustment script 126 at the appropriate days and times in order to apply the optimized QoS settings for that timeslot and restart the QoS functions 122 so that the changes are immediately applied to the network device 120.

According to some embodiments, the CQP service 134 may further provide an API for the optimization control module 124 to allow the network device 120 to check in on a scheduled basis (e.g., once a day). The heartbeat API may accept updated line metric values from the network device 120 and return updated QoS settings and/or a new QoS configuration to be applied to the network device 120, as well as schedule updates for the scheduler 128 based on analysis of historical data. For example, each time a network device 120 checks in using the heartbeat API, the CQP service 134 may update the historical data for the device in the data repository 150. The CQP service 134 may then crawl through the historical data and determine any appropriate adjustments to the QoS settings, configuration, and/or schedule for the device. The heartbeat API may comprise the following:

Input:
Line up current line upload rate in kbit/s
Line down current line download rate in kbit/s
Atten-up current line up attenuation in dBs
Atten_down current line down attenuation in dBs
SNR_up current line up SNR in dBs
SNR_down current line down SNR in dBs Output:
upload QoS value, download QoS value
uci cmd, uci cmd 2, uci cmd n
schedule1, schedule2, . . . schedulen The CQP service 134 may further provide an API for the optimization control module 124 to upload log files from the network device 120 which may then be utilized in the optimization process, as described herein. The upload log file API may comprise the following:

Input:
logfile contents
Output:
result (success or fail)

The CQP service 134 may further provide an API for the optimization control module 124 to set test parameters to optimize correctly on low and high-bandwidth connections. The get streams API may return the number of streams to use in testing based on the type of connection of the network device 120 to the network(s) 110, the line speed of the connection for both upload and download testing, and/or the like. The get streams API may comprise the following:

Input:
streams dsl, vdsl, cable
upload line upload in kbit/s (if known from device)
download line download in kbit/s (if known from device)
Output:
number of streams (upload and download)

According to further embodiments, the configuration optimization system 100 also includes performance testing services 140 that are available to the network device 120 across the network(s) 110 as targets for performance measuring processes performed by the optimization control module 124, as described herein. In some embodiments, the performance testing services 140 may be provided by cloud-based servers hosting instances of the netperf server process. For example, the performance testing services 140 may be hosted on Linux servers deployed via AMAZON EC2™ from Amazon Web Services, Inc. Additionally or alternatively, various public and ISP-specific targets may be utilized for measuring performance of the network connection.

In further embodiments, the configuration optimization system 100 also includes a data repository 150 that stores the information required for performing the processes and functions described herein. For example, the data repository 150 may store registration information for the network device 120, results of optimization processes and tuning metrics for the device, uploaded logs from the device, and the like. In some embodiments, the data repository 150 may be implemented using a cloud-based relational database, such as AMAZON RELATIONAL DATABASE SERVICE™ (RDS) from Amazon Web Services, Inc.

According to further embodiments, the configuration optimization system 100 includes a batch analytics module 160. The batch analytics module may run a series of analytical processes that utilize test results from different times of data, uploaded tuning metrics and line metrics from network devices 120, and other data in the data repository 150 to calculate outputs such as the optimum time schedule and values for shifting the QoS settings in a given device or set of devices to account for changing network conditions throughout the day/week. The batch analytics module 160 may further provide for scheduling additional optimization processes on one or more network devices 120, adjusting QoS setting lookup table values and algorithms for various ISPs, connection types, etc. based on broad analysis of test results, determining periods of line stability problems or backhaul sag in particular ISP networks, determining time intervals for optimization testing for devices based on ISP, connection type, etc., and/or the like. In some embodiments, the batch analytics module 160 may be implemented as a series of scheduled processes deployed on cloud-based servers, such as Linux servers deployed via AMAZON EC2™ from Amazon Web Services, Inc.

According to some embodiments, the scheduler 128 of a network device 120 may initially be configured to initiate the optimization control module 124 to perform the optimization process every T (e.g., 120) minutes for N (e.g., 7) days. The optimization process may include the upload of tuning metrics to the IQ services 130 via the retrieve post-test QoS configuration API or the post tuning metrics API of the CQP service 134 and storage of the tuning metrics in the data repository 150 by timestamp. At the end of this initial "tuning" phase, the IQ services 130 and the batch analytics module 160 may utilize the uploaded tuning metrics to compute the optimal QoS settings for the QoS functions 122 of the network device 120 for multiple (e.g., 4) periods during the day that the device should apply to achieve best results. At the end of the next optimization process, the optimization control module 124 may download a new "maintenance" schedule from the IQ services 130 so that the optimal QoS settings can be applied at the correct times of day. The IQ services 130 may also adjust the initial "tuning" and "maintenance" schedules as it sees fit if reported metrics fall outside the norms.

In further embodiments, the batch analytics module 160 may provide for notifications to users of the tracked network devices 120 of various conditions based on information collected and stored in the data repository 150. For example, the batch analytics module 160 may be periodically executed to generate notifications to users for:

No contact after first 24 hours due to possible user disconnection,
Unable to run the optimization adjustment script 126 process due to possible line issues,
Unable to run additional optimization adjustment script 126 in first 24 hours due to possible line issues,
Frequent line drops in the first 24 hours,
Frequent line drops in X period of time,
High latencies with no load detected indicating a possible misconfiguration,
ISP-specific configuration suggestions based on collected data,
and the like.

Figure 2:
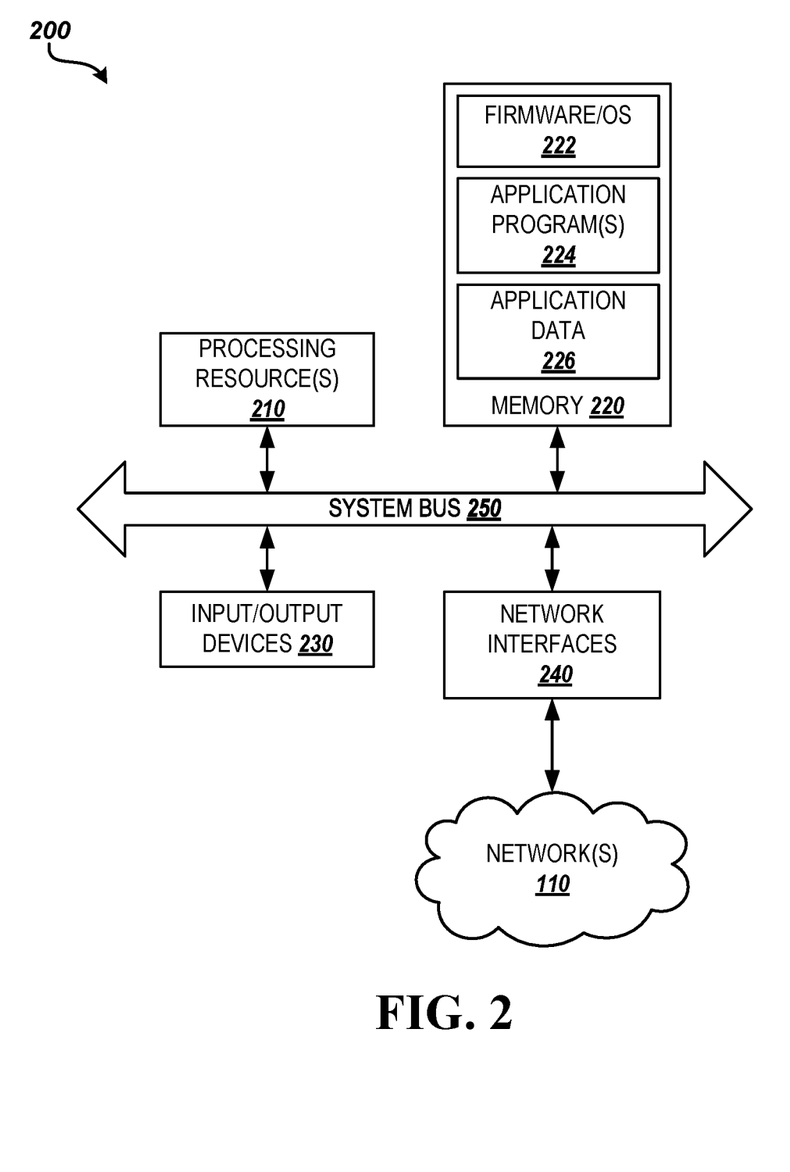
FIG. 2 is a block diagram illustrating a computer architecture for network devices, servers, and other computing devices described herein as part of the system for automatically optimizing QoS configuration in networking equipment, according to various implementations of the present disclosure.

FIG. 2 is a block diagram illustrating a computing architecture 200 for networking equipment and other computing devices utilized in the configuration optimization system 100, according to various embodiments. The computing architecture 200 may be utilized in the network device 120, cloud-based servers, or other computer systems described herein or for performing the methods described herein. As shown in this embodiment, the computing architecture 200 includes processing resource(s) 210 and a memory 220. The computing architecture 200 further includes input/output devices 230 and network interfaces 240. The components of the computing architecture 200 may be interconnected and may communicate with each other via a system bus interface 250 or other suitable communication devices.

The processing resource(s) 210 may comprise one or more general-purpose or specific-purpose processors, microcontrollers, FPGAs, and/or the like for controlling the operations and functions of the server or device. In some implementations, the processing resource(s) 210 may include a plurality of processors, computers, servers, or other processing elements for performing different functions within the computing architecture 200. The memory 220 may include any combination of volatile and non-volatile memory. For example, volatile memory may comprise random access memory ("RAM"), dynamic RAM ("DRAM"), static RAM ("SRAM"), and the like, while non-volatile memory may comprise read only memory ("ROM"), electrically erasable programmable ROM ("EEPROM"), FLASH memory, magnetic storage devices, such as a hard-disk drive ("HDD"), optical storage devices, such as a DVD-ROM drive, and the like. The memory may be configured to store any combination of information, data, instructions, software code, and the like.

According to some embodiments, the memory 220 may store a firmware and/or operating system ("OS") 222 for controlling the basic operation of the device or server. For example, the memory 220 of a network device 120 may store a firmware/OS 222 comprising the OpenWRT® Linux distribution. The memory 220 may further store application program(s) 224 and application data 226 for performing the specific processes or functions for automatically optimizing QoS configuration in networking equipment, as described herein. For example, the memory 220 of the network device 120 may store the optimization control module 124, the optimization control process script 125, the optimization adjustment script 126, and the like. In addition, the IQ services 130, batch analytics module 160, the data repository 150, and/or the like may be stored in one or more memories 220 and run on the same or different computer systems and/or servers.

In addition to the memory 220, the computing architecture 200 may include other computer-readable media storing information, data, instructions, software code, etc. It will be appreciated by those skilled in the art that computer-readable media can be any available media that may be accessed by the computing architecture 200, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, EEPROM, FLASH memory, or other solid-state memory technology, DVD-ROM, BLU-RAY or other optical storage, magnetic cassettes, magnetic tape, magnetic disk storage or other magnetic storage devices and the like. According to some embodiments, the computing architecture 200 may include computer-readable media storing processor-executable instructions that cause the processing resource(s) 210 to perform aspects of the method 300 described herein in regard to FIGS. 3A-3C.

The input/output devices 230 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 230 may also include interaction devices configured to receive input and provide output, such as dongles, touch screen devices, and other input/output devices, to enable input and/or output communication.

The network interfaces 240 may include various devices for interfacing the computing architecture 200 with one or more types of servers, computer systems, and communication systems, such as a network interface adaptor as is known in the art. The network interfaces 240 may include devices for communicating between and among the network device 120, the IQ services 130, the performance testing services 140, the data repository 150, the batch analytics module 160, and the like over the network(s) 110, for example.

In some embodiments, each component of the computing architecture 200 as shown may include multiple components on multiple computer systems of a network. For example, the computing architecture 200 may comprise servers, such as application servers, file servers, database servers, web servers, etc., for performing various functions described herein. The servers of the computing architecture 200 may for example be physically separate computer servers or virtual servers hosted in a virtual environment, among other implementations. In further embodiments, one or more components of the computing architecture 200 may be combined in a single physical component. For example, the processing resources 210, the memory 220, the network interfaces 240, and the system bus 250 may be combined in a single SoC implementation. It will be appreciated that the network device 120, the servers, and/or other computing resources of the configuration optimization system 100 may not include all of the components shown in FIG. 2, may include other components that are not explicitly shown in FIG. 2, or may utilize an architecture completely different than that shown in FIG. 2.

Figure 3A:
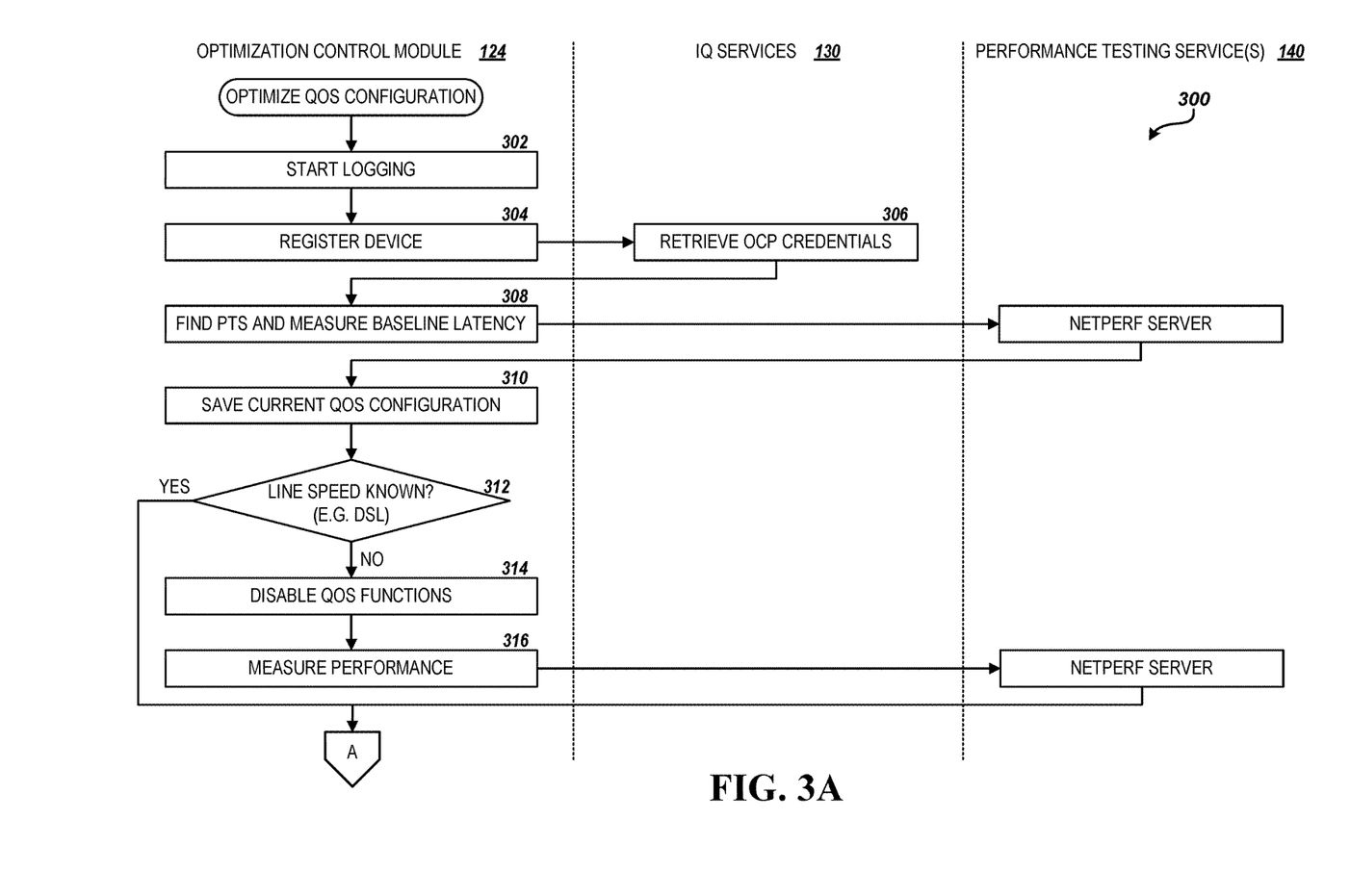
FIGS. 3A-3C are a flow diagram illustrating one method for automatically optimizing QoS configuration in networking equipment, according to some embodiments of the present disclosure.
Figure 3B:
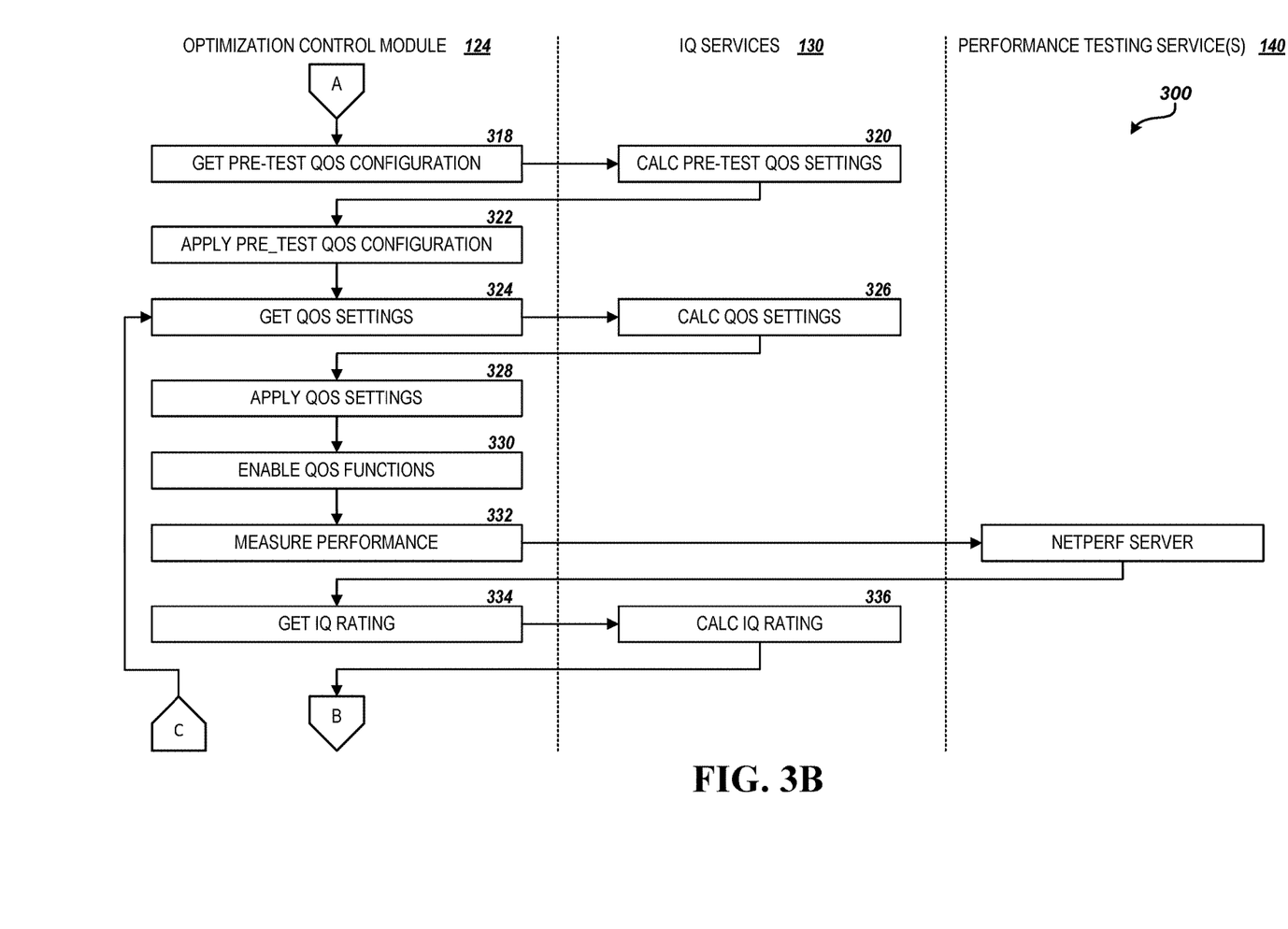
Figure 3C:
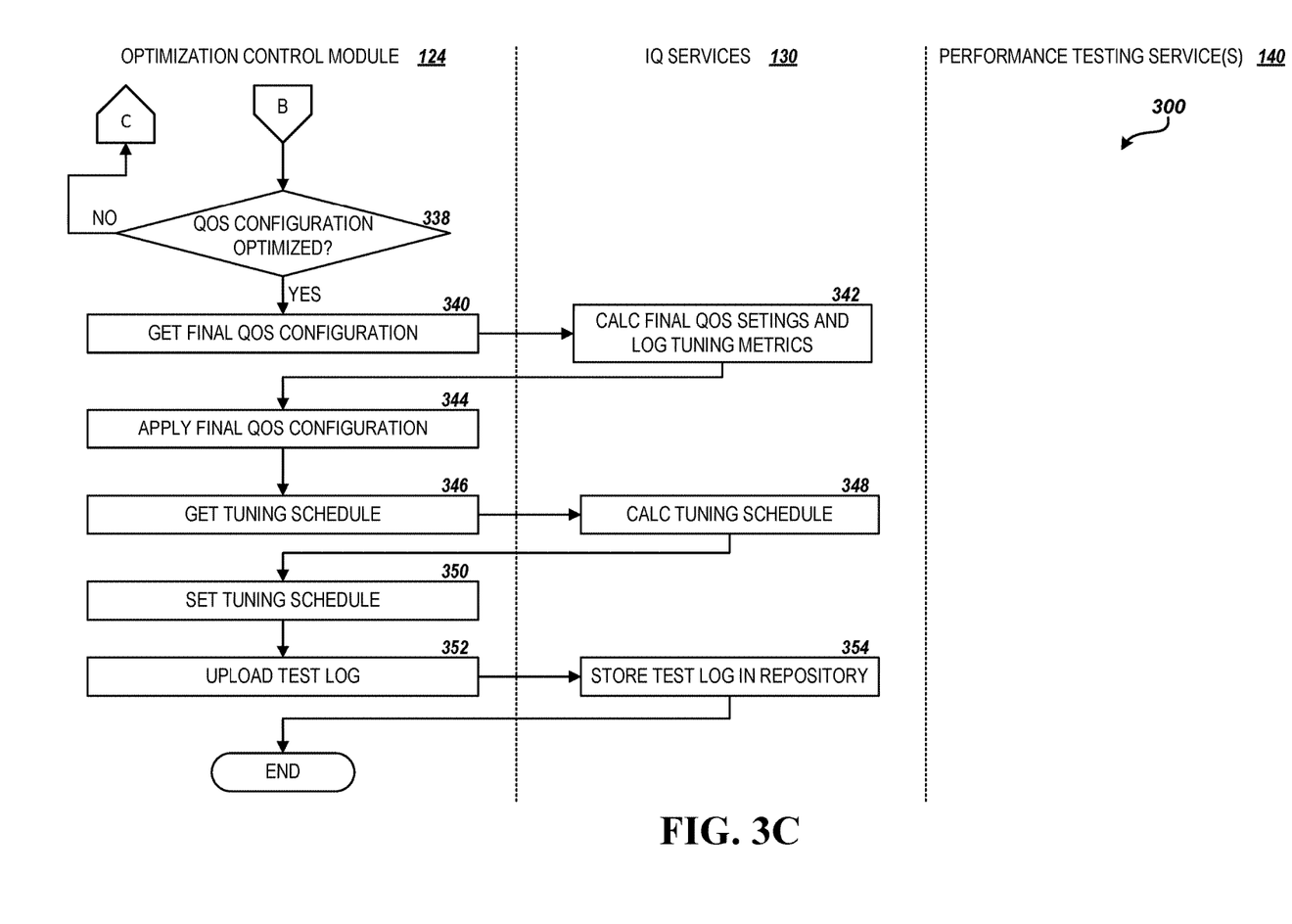

FIGS. 3A-3C show an example of one method 300 for automatically optimizing QoS configuration in networking equipment, according to some embodiments of the present disclosure. The method 300 may be utilized by a newly deployed network device 120, such as an Internet router, to automatically have the QoS functions 122 optimally configured to the existing Internet connection link constraints to prevent link saturation and therefore minimize the occurrence of bufferbloat. For example, a user installing the network device 120 may initiate a user interface that walks them through the installation, configuration, and optimization process.

The method 300 may also be initiated automatically by the network device 120 on a periodic basis to collect performance measures and adjust the configuration of the QoS functions to ensure optimal settings even if line speed and quality of the connection vary across the time of day. For example, streaming video is generally affected by congestion in Internet service provider ("ISP") networks, typically at peak times in the evening hours, necessitating re-adjustment of the QoS configuration settings during those periods to maintain optimum performance. The scheduler 128 of the network device 120 may be configured to periodically initiate the method 300 in order to apply optimal QoS settings to the device during these periods.

According to some embodiments, the method 300 may be implemented by the optimization control module 124 executing on the network device in conjunction with the IQ services 130 and performance testing service(s) 140 available across the network(s) 110, as shown in FIGS. 3A-3C. For example, the method 300 may be embodied in the optimization control process script 125 and/or the optimization adjustment script 126 on the network device 120. In other embodiments, the method 300 may be implemented by various other modules, services, scripts, or components of the configuration optimization system 100.

The method 300 begins at step 302, where the optimization control module 124 initiates logging of the optimization process. Next, at step 304, the optimization control module 124 registers the device with the IQ services 130. For example, the optimization control module 124 may call the registration service 132 to retrieve the credentials for subsequent calls to the IQ services 130. The IQ services 130 retrieve the credentials, as shown at 306, and passes them back to the optimization control module 124.

According to some embodiments, steps 304 and 306 may only be performed during initial setup of the network device 120. The registration service 132 may generate credentials for the device and perform other initialization functions, and the optimization control module 124 may store the generated credentials locally. Subsequent calls to the IQ services 130 can used the locally stored credentials. In addition, the optimization control module 124 may call the pre-test component update service 133 during initial setup of the network device 120 to ensure the network device has the latest version of the firmware, extensions, and/or shell scripts before executing the test.

Next, the method 300 proceeds to step 308, where the optimization control module 124 locates a performance testing service 140 to utilize as a target for performance testing and measures a baseline latency to the selected performance testing service. This may be accomplished by pinging the server hosting the netperf service multiple times and averaging the round trip times, for example. Next at step 310 the current QoS configuration is saved in case the testing halts mid-process and the prior QoS configuration must be restored.

At shown at step 312, if the line speed of the connection is known (e.g., for a DSL connection), then the method 300 proceeds to step 318 as shown in FIG. 3B. If the line speed is not known, then the method proceeds from step 312 to step 314, where the optimization control module 124 disables the QoS functions 122 on the network device 120 and then initiates performance testing to measure connection speed, line quality, and other performance measures against the selected performance testing service 140, as shown at step 316. In some embodiments, performance testing may take into consideration other network traffic flowing through the network device 120 as well, such as downloads taking place, in addition to the communication with the selected performance testing service 140.

Next, at step 318, the optimization control module 124 gets the initial QoS configuration for performing the testing from the IQ services 130. For example, the optimization control module 124 may call the retrieve pre-test QoS configuration API of the CQP services 134 to get the initial QoS configuration based on the connection type and/or protocol. The CQP service 134 calculates the pre-test QoS configuration, as shown at step 320, and returns them to the optimization control module 124. At step 322, the optimization control module 124 applies the retrieved QoS configuration to the QoS functions 122 of the network device 120. According to some embodiments, the CQP service 134 may return QoS configuration as a series of standard configuration commands to be executed by the firmware of the network device 120. For example, the CQP service 134 may return a series of commands based on the Unified Configuration Interface ("UCI") implemented in OpenWRT®. To apply the QoS configurations settings, the optimization control module 124 simply executes the commands through the UCI of the firmware and logs the results.

Next, at step 324, the optimization control module 124 calls the calculate QoS API of the CQP service 134 to retrieve optimal QoS settings based on the provided performance measurements of the connection of the network device 120 to the network(s) 110, such as latency, line speed (up and down), and the like in addition to other properties of the connection, such as connection type, (DSL, VDSL, cable, etc.), connection protocol (PPPoE, DHCP, etc.), and the like. The CQP service 134 calculates the optimal QoS settings based on the provided performance measurements at step 326, and returns them to the optimization control module 124. At step 328, the optimization control module 124 applies the QoS settings to the QoS functions 122 in the network device and enables the QoS functions, as shown at step 330.

From step 330, the method 300 proceeds to step 332, where optimization control module 124 again initiates performance testing to measure connection speed, line quality, and other performance measures against the selected performance testing service 140 using the optimal QoS configuration and settings. Next, at step 334, the optimization control module 124 calls the calculate IQ rating API of the CQP service 134 to retrieve the IQ rating calculated for the configured QoS functions 122 based on the performance measurements from the performance testing. The CQP service 134 calculates the IQ rating based on the provided performance measures, and returns the rating to the optimization control module 124. Next, the CQP service 134 and/or the optimization control module 124 determine whether additional optimization is required based on the IQ rating, as shown at step 338 in FIG. 3C. For example, the IQ rating may be compared to a threshold value to determine if additional optimization is to be performed.

If the QoS configuration is not optimal, then the method 300 returns to step 324 in FIG. 3B, where the optimization control module 124 calls the calculate QoS API of the CQP service 134 to retrieve new optimal QoS settings based on the last performance measurements and the process is repeated until the QoS configuration is optimal. In other embodiments, if the CQP service 134 determines the QoS configuration is not optimal, it may return new QoS settings with the IQ rating which may then be applied to the QoS functions 122 and the process repeated. Once an optimal QoS configuration has been achieved, the method 300 proceeds from step 338 to step 340, where the optimization control module 124 requests final QoS configuration and settings from the IQ services 130. For example, the optimization control module 124 may call the retrieve post-test QoS configuration API of the CQP service 134 to retrieve a post-test QoS configuration after optimization for final configuration settings for the QoS functions 122. The CQP service 134 calculates the final QoS configuration and settings at step 342 and returns them to the optimization control module 124. In addition, the CQP service may save the provided tuning metrics in the data repository 150 for future batch analytics, as described herein.

At step 344, the optimization control module 124 applies the final QoS configuration settings to the QoS functions 122 of the network device 120 and then requests tuning schedule(s) from the IQ services 130 for future runs of the optimization process, as shown at step 346. For example, the optimization control module 124 may call the retrieve tuning schedule API of the CQP service 134 to retrieve one or more schedules for performing periodic optimization of the QoS functions 122 of the network device 120 as well as other tuning operations. In some embodiments, the CQP service 134 calculates the schedule(s) based on historical tuning metrics stored in the data repository 150 and batch analytics, as described herein, and returns the schedules to the optimization control module 124. The optimization control module 124 may then apply the retrieved schedule(s) to the optimization and tuning processes through the scheduler 128 of the network device 120, as shown at step 350.

The method proceeds from step 350 to step 352, where the optimization control module 124 uploads the test log for the optimization process to the IQ services 130. For example, the optimization control module 124 may call the upload log file API of the CQP service 134 with the log file contents, and the CQP service may store the log file contents in the data repository 150, as shown at step 354. As described herein, the test log may be utilized with other tuning metrics by the batch analytics module 160 for continued analytics and optimization. From step 354, the method 300 ends.

Figure 4A:
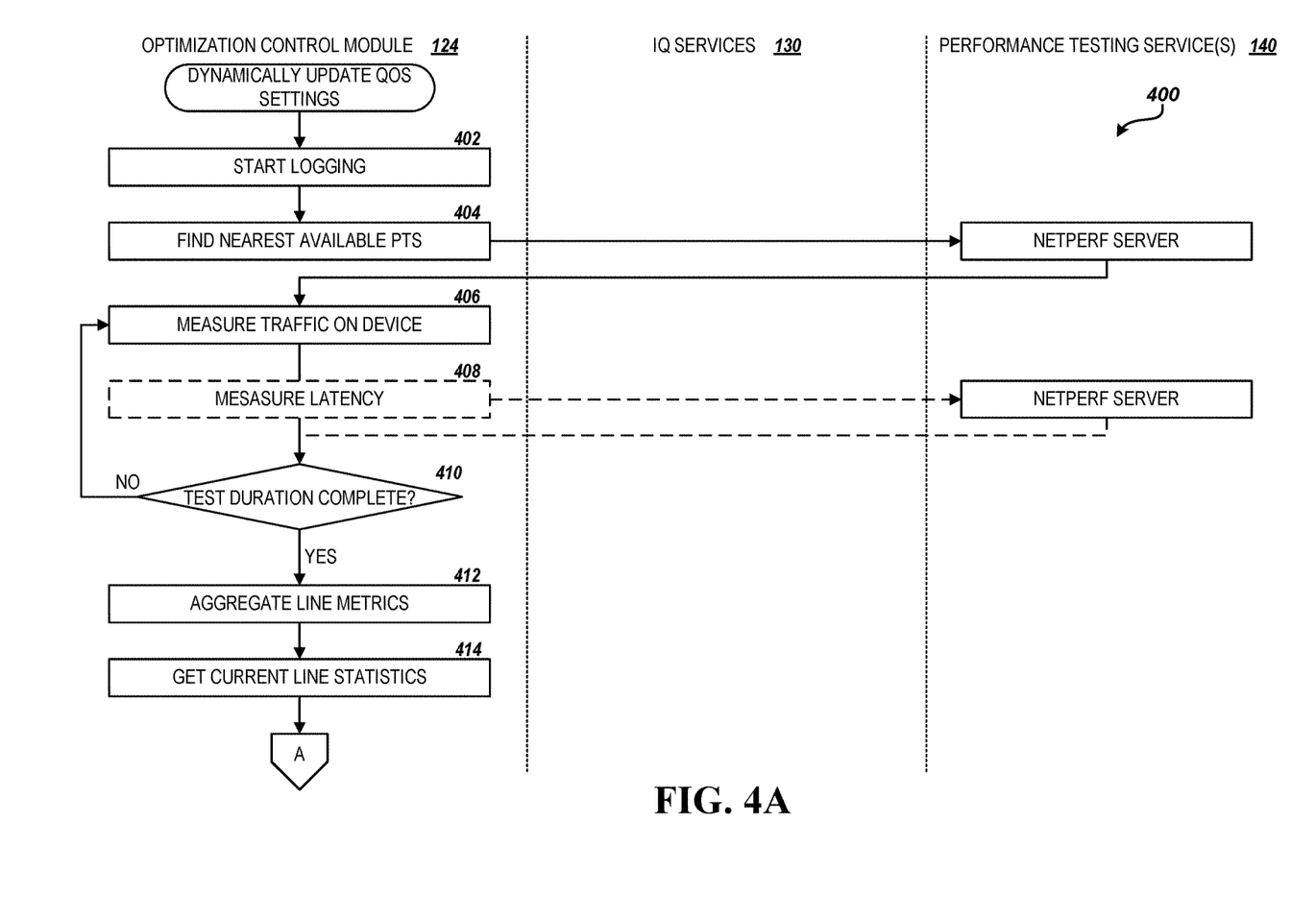
FIGS. 4A-4B are a flow diagram illustrating one method for dynamically applying optimized QoS configuration settings in networking equipment based on current line metrics, according to some embodiments of the present disclosure.
Figure 4B:
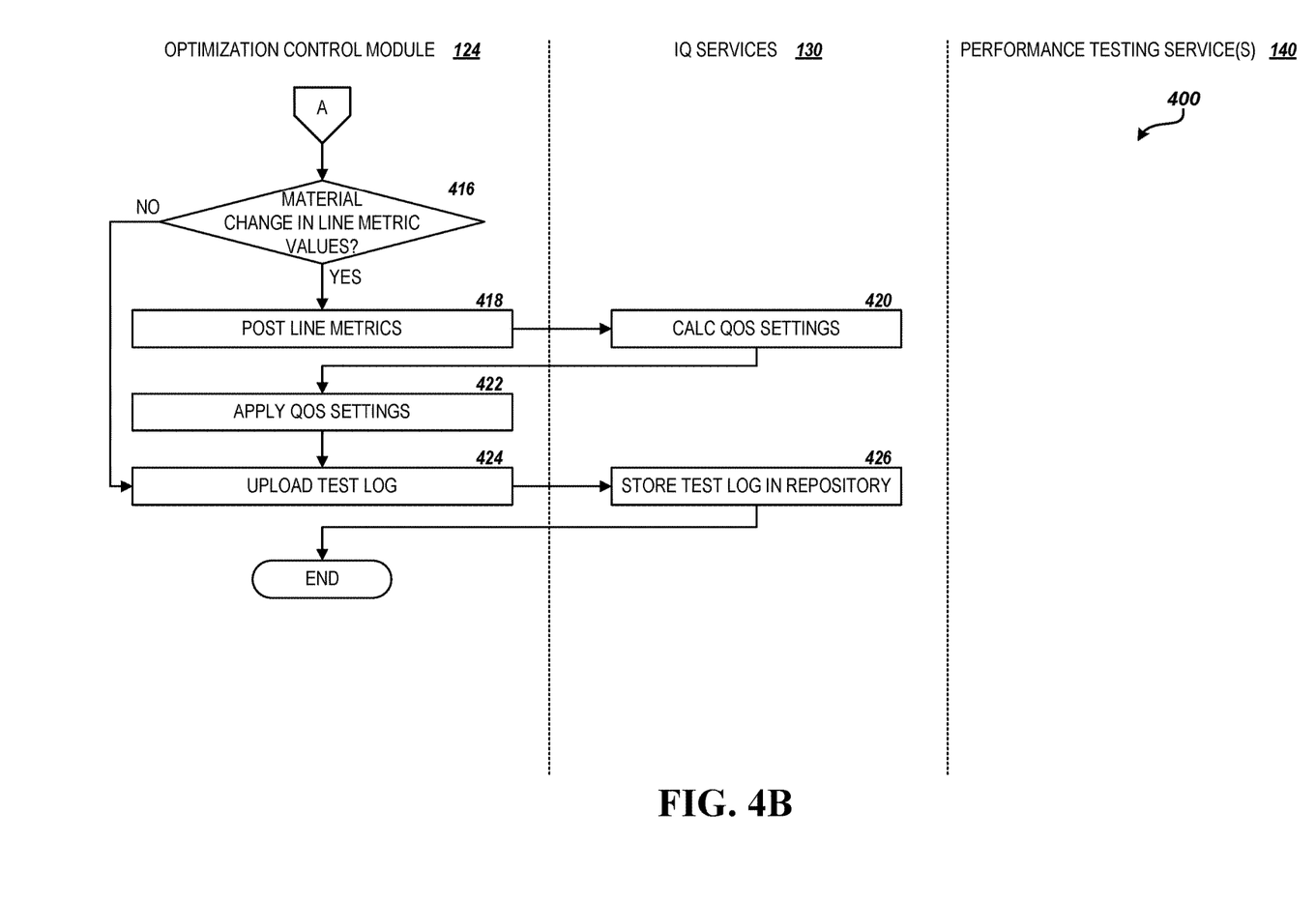

FIGS. 4A-4B show an example of one method 400 for dynamically updating QoS configuration based on current line metrics, such as link capacity (speed) in both upload and download directions, bandwidth utilization, traffic latency, signal attenuation, signal-to-noise ratios, and/or the like, according to embodiments of the present disclosure. The method 400 may be utilized by a network device 120 to continually monitor line conditions of the connection to the network(s) 110, such as an Internet router, in order to detect changes that require re-optimization of the QoS functions 122.

According to some embodiments, the method 400 may be implemented by the optimization control module 124 executing on the network device 120 in conjunction with the IQ services 130 and performance testing service(s) 140 available across the network(s) 110, as shown in FIGS. 4A-4B. For example, the method 400 may be embodied in the dynamic control process script 127 on the network device 120. In other embodiments, the method 400 may be implemented by various other modules, services, scripts, or components of the configuration optimization system 100. In some embodiments, the scheduler 128 of the network device 120 may be configured to execute the dynamic control process script 127 on frequent periodic basis, e.g. every minute, to perform passive measurements of line metrics to determine if latencies exceed limits pre-set by the IQ services 130, and apply modified QoS settings as necessary.

The method 400 begins at step 402, where the optimization control module 124 initiates logging of the dynamic control process. The method 400 proceeds to step 404 where the optimization control module 124 locates a performance testing service 140 to utilize as a target for measuring latency. This may be accomplished by pinging the server hosting the netperf service, for example.

The optimization control module 124 then performs a series tests over a duration of time to collect line metrics for analysis. For example, the optimization control module 124 may gather line metrics over a 10 second period. According to some embodiments, these tests may be designed to limit interference with the normal flow of network traffic in the network device 120. The tests may rely on the passive collection of metrics and/or utilize low bandwidth communication with the performance testing services 140. For example, as shown at step 406, the optimization control module 124 may measure line metrics associated with normal network traffic flow in the network device 120. This may include bandwidth utilization (up and down) of the network connection, average latency in network transmissions, and the like. Alternatively or additionally, the optimization control module 124 may actively measure latency of in the network connection. This may be the case if there is insufficient traffic through the network device 120 during the testing duration to detect increased latency, for example. The optimization control module 124 may measure latency by pinging the server hosting the netperf service, as shown at step 408. The duration of the active measurement may be longer than the passive testing duration, e.g., 20 seconds, according to some embodiments.

At step 410, the optimization control module 124 determines whether the test duration has completed. If not, the method 400 returns to step 406, where the optimization control module 124 continues to measure line metrics. Once the test duration has completed, the method 400 proceeds from step 410 to step 412, where the optimization control module 124 aggregates the line metrics over the test duration. For example, the optimization control module 124 may average measurements of bandwidth utilization and/or latencies for transmission to the IQ services 130. Next, at step 414, the optimization control module 124 gets line metrics related to the connection of the network device 120 to the network(s) 110, also referred to as "line statistics." Line statistics may include signal attenuation, SNR (up and down), sync rates, and the like.

From step 414, the method 400 proceeds to step 416, as shown in FIG. 4B, where the optimization control module 124 determines if there has been a material change in latency or other line metrics or line statistics for the network device 120. For example, the optimization control module 124 may calculate variances, or "deltas," for the line metric values based on the previously measured values, and then determine if the deltas exceed some threshold percentage. In some embodiments, if the optimization control module 124 determines latency and/or other line metrics have not materially changed since the last measurement, the optimization control module 124 may not send the collected line metrics to the IQ services 130 for calculation of new QoS settings, and the method 400 proceeds to step 424, as described below. In other embodiments, the optimization control module 124 may always send the collected line metrics to the IQ services 130 which maintains past line metric values for each network device 120 in order to determine variances in the metric values and calculate potential changes to the QoS settings.

If the optimization control module 124 determines that latency and/or other line metrics have materially changed, the method 400 proceeds from step 416 to step 418, where the optimization control module 124 posts the collected line metrics to the IQ services 130. For example, the optimization control module 124 may call the dynamic QoS calculation API of the CQP service 134, as described above in regard to FIG. 1, with the line metrics collected at steps 406-414. At step 420, the IQ services 130 analyzes the posted line metrics to determine any new QoS settings warranted by the changed line metrics. According to embodiments, if latencies exceed threshold values, or if signal attenuation or SNR deltas indicate degradation in the connection, the CQP service 134 may reduce the upload and/or download QoS bandwidth limitation values accordingly until latencies go back down or line metrics improve.

For example, when material changes in line metrics for a known modem type are detected, the IQ services 130 may utilize the same logic and algorithms used at initial configuration of the network device to determine appropriate QoS settings. In some embodiments, a percentage of the reported line up and line down speeds may be utilized as the new QoS settings values. The percentage may depend on connection type (DSL, VDSL, cable, etc.,) and traffic direction (up or down) and may be obtained from a look up table. For example, for DSL and VDSL, a percentage of 15% may be utilized, while 10% may be utilized for cable.

According to further embodiments, if a material change in latency is detected, the IQ services 130 may first determine if a sufficient minimum level of traffic (e.g. >50% of maximum capacity or currently set QoS speeds) exists through the network device 120 before analyzing the current metrics. If sufficient traffic exists to make the line metric values valid, the IQ services 130 may then determine whether the latency is within a maximum acceptable value (e.g. 100 ms.). The maximum acceptable value may be determined based on the connection type (DSL, VDSL, cable, etc.) and may be retrieved from a lookup table. If the latency is greater than the maximum acceptable value, then the IQ services 130 may utilize the lookup tables to determine a percentage to reduce the QoS settings based on the range of latency. For example, if the latency is between 100 ms and 500 ms, the QoS values may be reduced by 10% in the direction of heaviest load (or both up and down if both directions are loaded). If the latency is in a higher range, e.g., between 500 ms and 1,000 ms) the QoS values may be reduced by an even larger percentage (e.g. 50%). The ranges of latency and percentages by which to reduce the QoS values may be determined from published optimization matrices and algorithms, crowd sourced values, extensive configuration testing, and the like, and may vary based on ISP, connection technology, or other device-specific properties.

The method 400 proceeds from step 420 to step 422, where the optimization control module 124 applies any new QoS settings supplied by the IQ services 130 to the QoS functions 122 of the network devices. According to some embodiments, the optimization control module 124 may restart the QoS functions process on the network device so that the new QoS settings can take immediate effect. Next, the method proceeds to step 424, where the optimization control module 124 uploads the test log for the dynamic control process to the IQ services 130. For example, the optimization control module 124 may call the upload log file API of the CQP service 134 with the log file contents, and the CQP service may store the log file contents in the data repository 150, as shown at step 426. As described herein, the test log may be utilized with other tuning metrics by the batch analytics module 160 for continued analytics and optimization. From step 426, the method 400 ends.

According to further embodiments, the IQ services 130 may store and track line metrics, such as signal attenuation, SNR, sync rates, and the like, captured by the optimization control module 124 from the network devices 120 during the optimization processes and dynamic control processes described herein. For example, the optimization control module 124 on a network device 120 may provide line metrics to the IQ services 130 when calling the post tuning metrics API or the dynamic QoS calculation API of the CQP service 134, as described above in regard to FIG. 1. The CQP service 134 may store the line metrics values from each API call in the data repository 150 associated with the network device 120.

The CQP service 134 may further invoke a function to analyze the current and historical line metric values from the data repository 150 to detect patterns that may indicate an unstable line. If the CQP service 134 detects patterns of instability in the connection of the network device 120, the network device may be flagged as having an unstable connection in the data repository 150. When future requests are made to the CQP service 134 to compute QoS settings for the network device 120, the CQP service 134 may return less aggressive QoS values than what may be returned for devices with stable lines. Additionally, the CQP service 134 may issue notifications to alert the user of the network device 120 that the device has substantial line stability and/or configuration issues that need to be addressed, along with possible next steps for resolving such issues, according to some embodiments.

If the analysis of the current and historical line metric values from the data repository 150 indicates that a network device 120 previously flagged as having an instable connection indicates that the connection has returned to a stable state, the CQP service 134 may remove the unstable line flag associated with the device in the data repository. In addition, if the analysis determines that the line speed of a network device 120 has changed significantly, e.g., due to a user of the device upgrading or downgrading their service level with their ISP, the CQP service 134 may schedule the network device 120 for a new optimization process, such as that described above in regard to FIG. 3, in order to optimize the QoS configuration of the device to the new line speeds.

Other embodiments may include additional options or may omit certain options shown herein. One should note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method of optimizing Quality of Service ("QoS") functions of a network device comprising the steps of:
    measuring, by the network device, current line metric values associated with a network connection of the network device;
    comparing, by the network device, the current line metric values to previously measured values to determine whether there has been a material change in a line metric value;
    upon determining that there has been a material change in a line metric value, computing new QoS settings for the network device based on the current line metric values measured;
    applying, by the network device, the new QoS settings to the QoS function of the network device; and
    repeating the measuring, comparing, computing, and applying steps on a periodic basis.

2. The method of claim 1, wherein the measuring and comparing steps are performed on a high frequency basis by the network device.

3. The method of claim 1, wherein measuring the current line metric values comprises passively collecting line metric values associated with normal network traffic flow in the network device.

4. The method of claim 1, wherein measuring the current line metric values comprises actively measuring latency of traffic to a performance testing service over the network connection.

5. The method of claim 1, wherein the current line metric values comprise values for one or more of latency, bandwidth utilization, sync rate, signal attenuation, and signal-to-noise ratio.

6. The method of claim 1, wherein determining whether there has been a material change in a line metric value comprises:
    computing a variance of the line metric value from a corresponding previously measured value;
    comparing the variance to a threshold percentage; and
    if the variance exceeds the threshold percentage, determining that the material change in the line metric value has occurred.

7. The method of claim 1, wherein, upon determining that there has been a material change in the line metric value, the network device sends the current line metric values to a web service over the network connection, the web service configured to compute the new QoS settings based on the received current line metric values and return the new QoS settings to the network device.

8. The method of claim 7, wherein the web service is further configured to store received line metric values in a data repository, and to periodically analyze the stored line metric values in the data repository to compute a plurality of optimal QoS settings, each associated with a time of day.

9. The method of claim 8, wherein the web service is further configured to return schedules comprising the plurality of optimal QoS settings and associated time of day to the network device, the method further comprising the step of periodically applying, by the network device, the optimal QoS settings for the associated time of day based on the schedules returned from the web service.

10. The method of claim 1, wherein the network device comprises an Internet router.

11. A non-transitory computer-readable storage medium comprising processor-executable instructions that, when executed by a processing resource of a network device, cause the network device to:
    collect performance measurements associated with a connection of the network device to a network;
    send the performance measurements to a web service over the network, wherein the web service computes Quality of Service ("QoS") settings for the network device based on the performance measurements for the connection;

receive the computed QoS settings from the web service over the network; and apply the computed QoS settings to QoS functions of the network device.

12. The computer-readable storage medium of claim 11, wherein collecting performance measurements associated with the connection comprises communicating with a performance testing service over the network to measure one or more of line speed and latency of the connection.

13. The computer-readable storage medium of claim 11, wherein collecting performance measurements associated with the connection comprises passively collecting line metric values associated with normal network traffic flow over the connection.

14. The computer-readable storage medium of claim 13, wherein the line metric values comprise values for one or more of latency, bandwidth utilization, sync rate, signal attenuation, and signal-to-noise ratio.

15. The computer-readable storage medium of claim 13, containing further processor-executable instructions that cause the network device to repeat the collecting, sending, receiving, and applying steps at a high-frequency periodic interval.

16. The computer-readable storage medium of claim 11, containing further processor-executable instructions that cause the network device to repeat the measuring, sending, receiving, and applying instructions until it is determined that the configured QoS functions are optimized for the connection.

17. A system comprising:
a web service executing on a network and configured to compute and return optimized Quality of Service ("QoS") settings for network devices based on received line metrics; and
a network router operably connected to the network by a network connection and comprising a firmware, QoS functions, and an optimization control module configured to perform the steps of
collect current line metrics associated with the network connection,
determine if there has been a material change in a line metric value,
upon determining that there has been a material change in a line metric value, send the current line metrics to the web service,
receive the optimized QoS settings, and
apply the optimized QoS settings to the QoS functions of the network router.

18. The system of claim 17, wherein collecting the current line metrics comprises passively collecting values for one or more of latency, bandwidth utilization, sync rate, signal attenuation, and signal-to-noise ratio associated the network connection.

19. The system of claim 17, wherein the network router further comprises a scheduler, and wherein the collecting, determining, sending, receiving, and applying steps are initiated by the scheduler on a periodic basis according to a schedule provided by the web service.

20. The system of claim 17, wherein the optimized QoS settings comprise one or more configuration commands related to the QoS functions of the network router, and wherein applying the optimized QoS settings to the QoS functions comprises executing the one or more configuration commands on the network router.

* * * * *